US011367883B2

(12) United States Patent
Jeong et al.

(10) Patent No.: US 11,367,883 B2
(45) Date of Patent: Jun. 21, 2022

(54) ELASTOMERIC CELL FRAME FOR FUEL CELL, METHOD OF MANUFACTURING SAME, AND UNIT CELL USING SAME

(71) Applicants: HYUNDAI MOTOR COMPANY, Seoul (KR); KIA MOTORS CORPORATION, Seoul (KR)

(72) Inventors: Byeong-Heon Jeong, Yongin-si (KR); Jin Hyeok Yoo, Cheonan-si (KR); Seong Il Heo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 182 days.

(21) Appl. No.: 16/676,335

(22) Filed: Nov. 6, 2019

(65) Prior Publication Data
US 2020/0194810 A1 Jun. 18, 2020

(30) Foreign Application Priority Data
Dec. 12, 2018 (KR) .................. 10-2018-0160111

(51) Int. Cl.
*H01M 8/0273* (2016.01)
*H01M 8/0284* (2016.01)
*H01M 8/1004* (2016.01)

(52) U.S. Cl.
CPC ....... *H01M 8/0273* (2013.01); *H01M 8/0284* (2013.01); *H01M 8/1004* (2013.01)

(58) Field of Classification Search
None
See application file for complete search history.

(56) References Cited

U.S. PATENT DOCUMENTS 5,434,700 A 7/1995 Yoo
5,464,700 A * 11/1995 Steck .................. H01M 8/1007
429/483

(Continued)

FOREIGN PATENT DOCUMENTS

JP 2017-212126 A 11/2017
KR 10-0876262 B1 12/2008

(Continued)

OTHER PUBLICATIONS

U.S. Notice of Allowance dated Apr. 14, 2021 issued in U.S. Appl. No. 16/670,951.

(Continued)

*Primary Examiner* — Alix E Eggerding
(74) *Attorney, Agent, or Firm* — Morgan, Lewis & Bockius LLP (57) ABSTRACT

The present disclosure relates to an elastomeric cell frame for a fuel cell, a method of manufacturing the same, and a unit cell using the same, in which the elastomeric cell frame is integrally bonded to a membrane electrode assembly and a gas diffusion layer using a pair of elastomeric frames without a separate adhesive member. An elastomeric cell frame of a unit cell of a fuel cell according to an exemplary embodiment of the present disclosure includes: an insert including a membrane electrode assembly and a pair of gas diffusion layers disposed on and bonded to opposite surfaces of the membrane electrode assembly; and an elastomeric frame including a pair of elastomeric frames which is bonded to each other and has portions disposed on a lower surface and an upper surface of a rim of the insert, respectively, in an outer region of the insert.

18 Claims, 5 Drawing Sheets

(56) References Cited

U.S. PATENT DOCUMENTS

| | | |
|---|---|---|
| 8,685,588 B2 | 4/2014 | Kamada et al. |
| 10,658,683 B2 | 5/2020 | Sugishita et al. |
| 2002/0102453 A1* | 8/2002 | Suenaga ............ H01M 8/2483 |
| | | 429/465 |
| 2005/0014056 A1 | 1/2005 | Zuber et al. |
| 2008/0118802 A1 | 5/2008 | Szrama et al. |
| 2009/0029230 A1* | 1/2009 | Shirahama ............ H01M 8/242 |
| | | 429/404 |
| 2009/0162718 A1 | 6/2009 | Extrand |
| 2011/0311898 A1 | 12/2011 | Yamauchi et al. |
| 2012/0219874 A1 | 8/2012 | Suzuki et al. |
| 2013/0157175 A1* | 6/2013 | Sohma .................. H01M 8/10 |
| | | 429/535 |
| 2013/0183604 A1* | 7/2013 | Tanaka ................ H01M 8/0273 |
| | | 429/480 |
| 2013/0302722 A1* | 11/2013 | Boucher ............ H01M 50/183 |
| | | 429/535 |
| 2014/0234749 A1 | 8/2014 | Tanaka et al. |
| 2014/0287339 A1 | 9/2014 | Mitsuta et al. |
| 2015/0064600 A1 | 3/2015 | Katsuno et al. |

FOREIGN PATENT DOCUMENTS

| | | |
|---|---|---|
| KR | 10-1473500 B1 | 12/2014 |
| KR | 10-1783060 B1 | 9/2017 |
| KR | 10-2018-0011716 A | 2/2018 |

OTHER PUBLICATIONS

U.S. Office Action dated Jan. 25, 2022, issued in corresponding U.S. Appl. No. 16/742,602.

U.S. Office Action dated May 11, 2022, issued in corresponding U.S. Appl. No. 16/991,319.

* cited by examiner

ELASTOMERIC CELL FRAME FOR FUEL CELL, METHOD OF MANUFACTURING SAME, AND UNIT CELL USING SAME

CROSS-REFERENCE TO RELATED APPLICATION

This application claims the benefit of priority to Korean Patent Application No. 10-2018-0160111, filed on Dec. 12, 2018 in the Korean Intellectual Property Office, the disclosure of which is incorporated herein by reference.

TECHNICAL FIELD

The present disclosure relates to an elastomeric cell frame for a fuel cell, a method of manufacturing the same, and a unit cell using the same. More particularly, the present disclosure relates to an elastomeric cell frame for a fuel cell, a method of manufacturing the same, and a unit cell using the same, in which the elastomeric cell frame is integrally bonded to a membrane electrode assembly and a gas diffusion layer using a pair of sheet-shaped elastomeric frames without a separate adhesive member.

BACKGROUND

Fuel cells are considered as power generation systems in which chemical energy of fuel is electrochemically reacted in a stack so as to be converted into electric energy. The fuel cells can be used not only for supplying driving power for industrial use, household use, vehicles, etc., but also for supplying power for small electronic products such as portable devices. Recently, fuel cells have recently been increasingly used as clean energy sources having a high efficiency.

A unit cell of a general fuel cell includes a Membrane electrode Assembly (MEA) at the innermost position, in which the membrane electrode assembly includes a polymer electrolyte membrane capable of moving hydrogen ions (protons), and catalyst layers coated on the opposite surfaces of the polymer electrolyte membrane such that hydrogen and oxygen can react with each other, namely, a cathode and an anode.

In addition, a pair of separators, which supplies a reaction gas and discharges water produced by a reaction, is disposed on one surface and the other surface of the membrane electrode assembly, that is, the outer portions where the cathode and the anode are located. In this case, a Gas Diffusion Layer (GDL), which causes flows of the reaction gas and produced water to be expanded or smoothened, may be interposed between the membrane electrode assembly and the separators.

Meanwhile, in the prior art, a Membrane electrode-Gasket Assembly (MEGA), which integrally combines a membrane electrode assembly and a gasket to maintain an airtightness of a unit cell and to make the lamination process of the unit cell convenient, has been manufactured and used.

In recent years, an integrated frame, in which a gasket and an insert having a gas diffusion layer bonded to a membrane electrode assembly are integrated, has also been proposed.

However, in the conventional integrated frame, a plastic frame is bonded to the insert are using an adhesive. Therefore, in the case of manufacturing a unit cell using a conventional integrated frame, an adhesive member and a sealing member are separately required for bonding a separator and the integrated frame, which may increase material costs and production costs.

SUMMARY

The present disclosure provides an elastomeric cell frame for a fuel cell, a method of manufacturing the same, and a unit cell using the same, in which the elastomeric cell frame is integrally bonded to a membrane electrode assembly and a gas diffusion layer using a pair of sheet-shaped elastomeric frames without a separate adhesive member.

An elastomeric cell frame of a unit cell of a fuel cell according to an exemplary embodiment of the present disclosure includes: an insert including a membrane electrode assembly and a pair of gas diffusion layers disposed on and bonded to opposite surfaces of the membrane electrode assembly; and an elastomeric frame including a pair of elastomeric frames which is bonded to each other, wherein the pair of elastomeric frames has portions disposed on a lower surface and an upper surface of a rim of the insert, respectively, in an outer region of the insert.

The pair of elastomeric frames is integrally coupled to each other by, e.g., thermal bonding, which may be any one of hot-press bonding, ultrasonic bonding, high frequency bonding, vibration bonding, infrared bonding, radiant-heat bonding, calender bonding or laser bonding.

The elastomeric frame includes: a first elastomeric frame disposed to surround the lower surface and a side surface of the rim of the insert; and a second elastomeric frame disposed to surround the upper surface and the side surface of the rim of the insert and to face an upper surface of the first elastomeric frame in the outer region of the insert.

The first elastomeric frame has a first reaction surface through hole, in which the insert is disposed, and a first recess portion arranged in an inner peripheral surface of the first reaction surface through hole, the first recess portion surrounding the lower surface and the side surface of the rim of the insert, and the second elastomeric frame has a second reaction surface through hole, in which the insert is disposed, and a second recess portion arranged in an inner peripheral surface of the second reaction surface through hole, the second recess portion surrounding the upper surface and the side surface of the rim of the insert.

Between the insert and the first and second elastomeric frames, the elastomeric cell frame includes: a first thermal bonding portion in which the upper surface of the first elastomeric frame and a lower surface of the second elastomeric frame are bonded to each other in the outer region of the insert; a second thermal bonding portion in which the first recess portion of the first elastomeric frame and the lower surface of the rim of the insert are bonded to each other; a third thermal bonding portion in which the second recess portion of the second elastomeric frame and the upper surface of the rim of the insert are bonded to each other; and a fourth thermal bonding portion in which the first and second recess portions are bonded to the side surface of the insert.

The first elastomeric frame includes first inlet manifold through holes arranged in one side portion thereof such that a reaction gas and a coolant are introduced therethrough, and first outlet manifold through holes arranged in another side portion thereof such that the reaction gas and the coolant are discharged therethrough. The second elastomeric frame includes second inlet manifold through holes arranged in one side portion thereof to fluidly communicate with the first inlet manifold through holes, and second outlet manifold through holes arranged in another side portion thereof to fluidly communicate with the first outlet manifold through holes.

At least one of a lower surface of the first elastomeric frame or an upper surface of the second elastomeric frame has at least one protrusion seal disposed thereon to surround the insert along the outer region of the insert.

The elastomeric frame includes: a third elastomeric frame disposed to surround the lower surface and a side surface of the rim of the insert and including a third reaction surface through hole, in which the insert is disposed, and a third recess portion arranged in an inner peripheral surface of the third reaction surface through hole, the third recess portion surrounding the lower surface and the side surface of the rim of the insert; and a fourth elastomeric frame disposed to surround the upper surface of the rim of the insert and to face an inner peripheral surface of the third recess portion of the third elastomeric frame in the rim of the insert.

Between the insert and the third and fourth elastomeric frames, the elastomeric cell frame includes: a fifth thermal bonding portion in which the third recess portion of the third elastomeric frame and the lower surface of the rim of the insert are bonded to each other; a sixth thermal bonding portion in which the fourth elastomeric frame and the upper surface of the rim of the insert are bonded to each other; a seventh thermal bonding portion in which the third recess portion of the third elastomeric frame and the side surface of the rim of the insert are bonded to each other; and an eighth thermal bonding portion in which the third recess portion of the third elastomeric frame and a side surface of the fourth elastomeric frame are bonded to each other.

The third elastomeric frame includes third inlet manifold through holes arranged in one side portion thereof such that a reaction gas and the coolant are introduced therethrough, and third outlet manifold through holes arranged in another side portion thereof such that the reaction gas and the coolant are discharged therethrough. Outer peripheral surfaces of the fourth elastomeric frame and the insert have the same size.

At least one of a lower surface or an upper surface of the third elastomeric frame has at least one protrusion seal disposed thereon to surround the insert along the outer region of the insert.

The pair of elastomeric frames forming the elastomeric frame respectively has curved surfaces in a region in which the elastomeric frames face each other.

The pair of elastomeric frames forming the elastomeric frame respectively has complementary concave-convex structures in a region in which the elastomeric frames face each other.

The pair of elastomeric frames forming the elastomeric frame include a thermoplastic elastomer, e.g., Thermoplastic Elastomer (TPE).

A method of manufacturing an elastomeric cell frame of a unit cell of a fuel cell according to an exemplary embodiment of the present disclosure includes: providing an insert by bonding a gas diffusion layer to each of opposite surfaces of a membrane electrode assembly; providing a pair of elastomeric frames; disposing the insert between the pair of elastomeric frames; and pressing the pair of elastomeric frames while applying heat thereto so as to thermally bond the pair of elastomeric frames to each other.

The providing a pair of elastomeric frames includes providing the pair of elastomeric frames by molding a thermoplastic elastomer in a sheet shape.

The thermal bonding includes bonding the pair of elastomeric frames to each other by pressing all or a part of a region of the pair of elastomeric frames, which corresponds to an outer region of the insert, while applying heat thereto in a state in which the insert is interposed between the pair of the elastomeric frames.

In the thermal bonding, a temperature of heat applied to the pair of elastomeric frames is higher than a melting point of the pair of elastomeric frames.

In the thermal bonding, the pair of elastomeric frames is thermally bonded to each other without a separate adhesive member.

Furthermore, a unit cell of a fuel cell according to an exemplary embodiment of the present disclosure includes: an insert having a membrane electrode assembly and a pair of gas diffusion layers disposed on and bonded to opposite surfaces of the membrane electrode assembly; an elastomeric cell frame including a pair of elastomeric frames which is bonded to each other and respectively disposed on lower and upper surfaces of a rim of the insert; and a pair of separators disposed on opposite surfaces of the elastomeric cell frame, respectively, so as to induce flow of a reaction gas and a coolant.

According to various embodiments of the present disclosure, the following effects can be obtained.

First, since no bonding member is required for interfacial bonding with an insert, it is possible to reduce a material cost, and since an adhesive application process is eliminated, it is possible to reduce a manufacturing cost.

Second, it is possible to ensure the airtightness of a reaction region without a separate sealing member. Since the sealing member becomes unnecessary, it is possible to reduce a material cost and, and since a process of molding the sealing member is eliminated, it is possible to reduce a manufacturing cost.

Third, it is possible to prevent water produced in the reaction region from diffusing out of cells through an electrolyte membrane. Thus, it is possible to prevent an electrical short between the cells, and to prevent a fuel cell stack from being corroded due to the leakage of moisture.

Fourth, since the electrolyte membrane, which has been used in the region other than the reaction region, may not be used, it is possible to reduce a material cost and a manufacturing cost.

Fifth, it is advantageous to reduce the cell pitch compared with the conventional plastic frame, and it is possible to miniaturize the stack through volume reduction.

Sixth, the weight reduction effect can be expected compared with a conventional plastic frame in which an adhesive member and a sealing member are used.

Seventh, it is possible to simplify a production line and to improve stack productivity (cell lamination property) by reducing the number integration steps in laminating the stacks of fuel cells.

Eighth, since the components of the unit cell are integrated by being seated in a mold and then thermally bonded to each other, it is possible to improve the bonding accuracy with the insert, so that reduction of defect rate and mass production can be expected.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, exemplary embodiments of the present disclosure will be described in more detail with reference to the accompanying drawings. However, the present disclosure is not limited to the following exemplary embodiments but may be implemented in various different forms. The exemplary embodiments are provided only to complete disclosure of the present disclosure and to fully provide a person ordinarily skilled in the art with the category of the disclosure. In the drawings, like reference numerals refer to like elements.

Figure 1:
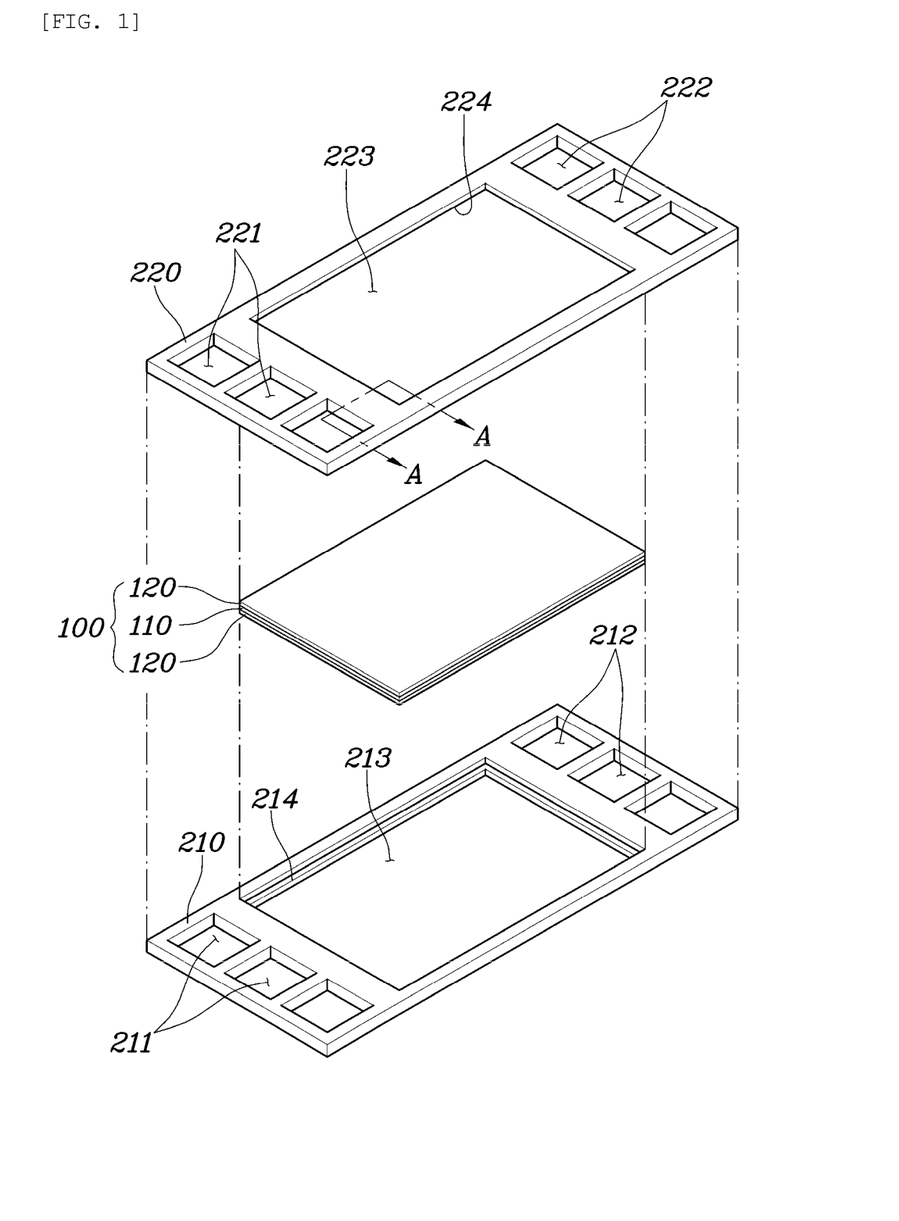
FIG. 1 is an exploded perspective view illustrating an elastomeric cell frame for a fuel cell according to an exemplary embodiment of the present disclosure.
Figure 2:
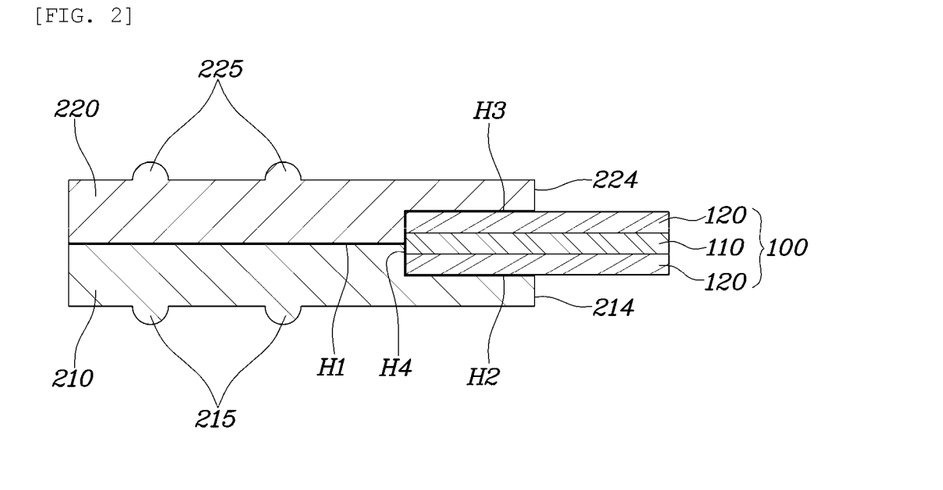
FIG. 2 is a cross-sectional view illustrating a main portion of the elastomeric cell frame for a fuel cell according to an exemplary embodiment of the present disclosure.

FIG. 1 is an exploded perspective view illustrating an elastomeric cell frame for a fuel cell according to an exemplary embodiment of the present disclosure, and FIG. 2 is a cross-sectional view illustrating a main portion of the elastomeric cell frame for a fuel cell according to an exemplary embodiment of the present disclosure. FIG. 2 is a cross-sectional view taken along line A-A in FIG. 1.

As illustrated in the drawings, an elastomeric cell frame for a fuel cell according to an exemplary embodiment of the present disclosure is an element constituting a unit cell of a fuel cell together with a pair of separators. The elastomeric cell frame includes an insert 100 having a membrane electrode assembly 110 and a pair of gas diffusion layers 120 disposed on both sides of the membrane electrode assembly 110; and an elastomeric frame 210, 220 integrally formed in the outer region of the insert 100 through thermal bonding.

Here, the thermal bonding may be any one of hot-press bonding, ultrasonic bonding, high frequency bonding, vibration bonding, infrared bonding, radiant-heat bonding, calender bonding and laser bonding. In particular, the thermal bonding is preferably a hot-press bonding in which heat and pressure are easily provided.

The insert 100 is an assembly obtained by laminating the membrane electrode assembly 110 and a pair of gas diffusion layers 120. Preferably, the gas diffusion layers 120 are disposed on the opposite surfaces of the membrane electrode assembly 110, respectively.

The membrane electrode assembly 110 is implemented as a general-electrode assembly, which includes a polymer electrolyte membrane capable of transporting hydrogen ions (protons) and catalyst layers coated on the opposite surfaces of the polymer electrolyte membrane such that hydrogen and oxygen can react with each other, that is, a cathode and an anode.

The gas diffusion layer 120 passes the reaction gas, which flows through a separator (not illustrated), therethrough while diffusing the reaction gas into the membrane electrode assembly 110. The gas diffusion layer 120 is made of a substrate alone or a microporous layer (MPL) formed on one surface of the substrate. At this time, the base material and the material of the microporous layer are implemented using a material applied to a general gas diffusion layer.

The elastomeric frames 210 and 220 are integrally formed in the outer region of the insert 100 for convenience in hermetical sealing and laminating processes of the insert 100. The elastomeric frames 210 and 220 are formed of a thermoplastic elastomer, e.g., Thermoplastic Elastomer (TPE), so as to be bonded through thermal bonding without using a separate adhesive member while maintaining a predetermined shape.

In other words, the elastomeric frames 210 and 220 may be integrally formed by thermal bonding a pair of sheet-shaped elastomeric frames 210 and 220, each of which disposed on one of the lower and upper surfaces of the rim of the insert 100, to each other in the outer region of the insert 100. Here, the "outer region" of the insert 100 means a region including the edge region of the insert 100 and the surrounding space of the edge region, and the "rim" of the insert 100 means the peripheral edge region of the insert 100.

For example, as illustrated in FIGS. 1 and 2, the elastomeric frames 210 and 220 include a first elastomeric frame 210 disposed to surround the lower and side surfaces of the rim of the insert 100, and a second elastomeric frame 220 disposed to surround the upper and side surfaces of the rim of the insert 100. In this case, the upper surface of the first elastomeric frame 210 and the lower surface of the second elastomeric frame 220 face each other in the outer region of the insert 100.

Particularly, it is possible to extend the interfaces between the first elastomeric frame 210 and the second elastomeric frame 220 and the insert 100 on the first elastomeric frame 210 and the second elastomeric frame 220 for hermetic bonding with the insert 100.

For example, a first reaction surface through hole 213, in which the insert 100 is disposed, is formed in the first elastomeric frame 210. A first recess portion 214 is arranged in the inner peripheral surface of the first reaction surface through hole 213 to surround the lower surface and the side surface of the insert 100. A second reaction surface through hole 223, in which the insert 100 is disposed, is formed in the second elastomeric frame 220. A second recess portion 224 is arranged in the inner peripheral surface of the second reaction through hole 223 to surround the upper surface and the side surface of the insert 100. Thus, the first elastomeric frame 210 and the second elastomeric frame 220 have structures symmetrical to each other with respect to a plane on which the insert 100 is disposed.

Accordingly, thermal bonding portions are formed through thermal bonding in the interfaces between the insert 100 and the first and second elastomeric frames 210 and 220, respectively, whereby solid bonding and integration are achieved.

In other words, as illustrated in FIG. 2, the thermal bonding portions may include: a first thermal bonding portion H1 in which the upper surface of the first elastomeric frame 210 and the lower surface of the second elastomeric frame 220 face each other to be thermally bonded to each other in the outer region of the insert 100; a second thermal bonding portion H2 in which the first recess portion 214 of the first elastomeric frame 210 and the lower surface of the insert 100 face each other to be thermally bonded to each other; a third thermal bonding portion H3 in which the second recess portion 224 of the second elastomeric frame 220 and the upper surface of the insert 100 face each other to be thermally bonded to each other; and a fourth thermal bonding portion H4 in which the first recess portion 214 and the side surfaces of the insert 100 face each other to be thermally bonded to each other.

Furthermore, in the elastomeric frames 210 and 220, an inlet manifold through holes and an outlet manifold through holes are provided to form manifolds for introducing and discharging the reaction gas and the coolant into and from the reaction surfaces formed by the insert 100.

For example, the first inlet manifold through holes 211, through which the reaction gas and the coolant are introduced, are arranged in one side portion of the first elastomeric frame 210, and the first outlet manifold through holes 212, through which the reaction gas and the coolant are discharged, are arranged in the other side portion. In addition, the second inlet manifold through holes 221 are arranged in one side portion of the first elastomeric frame 220, and the multiple second outlet manifold through holes 222 are arranged in the other side portion.

Thus, the first inlet manifold through holes 211 formed in the first elastomeric frame 210 and the second inlet manifold through holes 221 formed in the second elastomeric frame 220 are disposed at positions corresponding to each other so as to be fluidly communicated with each other. In addition, the first outlet manifold through holes 212 formed in the first elastomeric frame 210 and the second outlet manifold through holes 222 formed in the second elastomeric frame 220 are also disposed at positions corresponding to each other so as to be fluidly communicated with each other.

Furthermore, the elastomeric frames 210 and 220 may be provided with a means for hermetic sealing with the separator.

For example, on the lower surface of the first elastomeric frame 210, one or more first protrusion seals 215 surrounding the insert 100 may be formed along the outer region of the insert 100. In addition, on the upper surface of the second elastomeric frame 220, one or more second protrusion seals 225 surrounding the insert 100 may be formed along the outer region of the insert 100.

Meanwhile, an elastomeric frame according to an aspect of the present disclosure may be implemented by changing the shape thereof.

Figure 3:
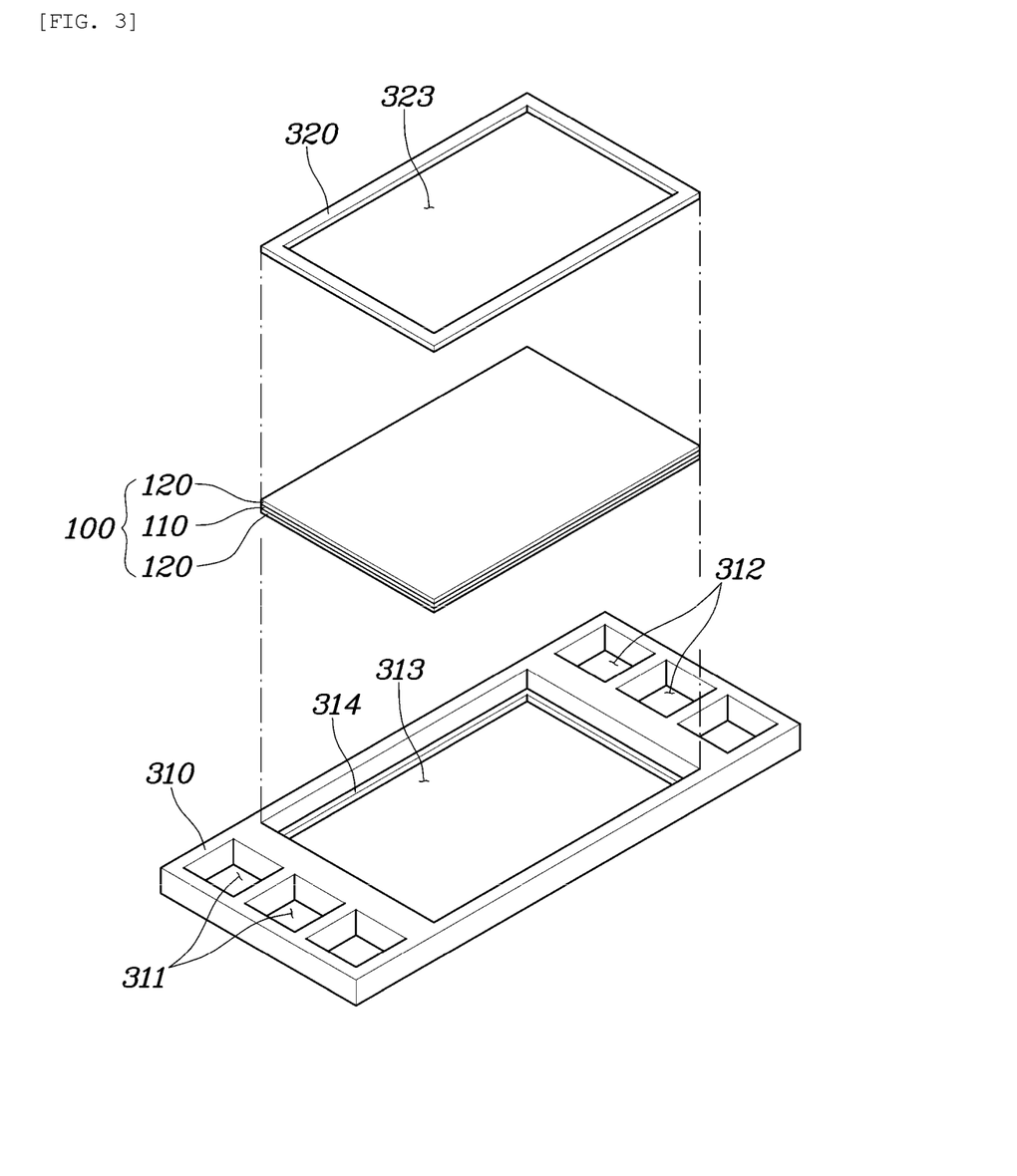
FIG. 3 is an exploded perspective view illustrating an elastomeric cell frame for a fuel cell according to another exemplary embodiment of the present disclosure.
Figure 4:
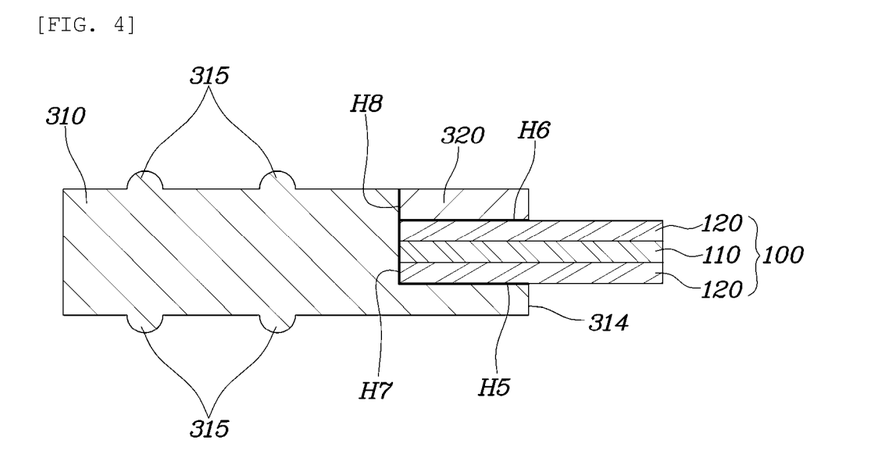
FIG. 4 is a cross-sectional view illustrating a main portion of the elastomeric cell frame for a fuel cell according to an exemplary embodiment of the present disclosure.

FIG. 3 is an exploded perspective view illustrating an elastomeric cell frame for a fuel cell according to another exemplary embodiment of the present disclosure, and FIG. 4 is a cross-sectional view illustrating a main portion of the elastomeric cell frame for a fuel cell according to still another exemplary embodiment of the present disclosure.

An elastomeric cell frame for a fuel cell according to an exemplary embodiment of the present disclosure includes an insert 100 and elastomeric frames 310 and 320 in the same manner as in the above-described exemplary embodiment. At this time, the insert 100 is the same as the insert 100 of the above-described exemplary embodiment.

However, the elastomeric frames 310 and 320 include a third elastomeric frame 310 disposed to surround the lower and side surfaces of the rim of the insert 100, and a fourth elastomeric frame 320 disposed to surround the upper surface of the rim of the insert 100. In this case, the side surface of the third elastomeric frame 310 and the side surface of the fourth elastomeric frame 320 face each other in the rim of the insert 100.

For example, as illustrated in FIG. 3, a third reaction surface through hole 313 in which the insert 100 is disposed is formed in the third elastomeric frame 310, and a third recess portion 314 surrounding the lower surface and the side surface of the insert 100 is formed in the inner peripheral surface of the third reaction surface through hole 313. At this time, the depth of the region which is formed by the third recess portion 314 to seat the insert 100 thereon is preferably equal to the sum of the thickness of the insert and the thickness of the fourth elastomeric frame 320.

In addition, the fourth elastomeric frame 320 is provided with a fourth reaction surface through hole 323 in which the insert 100 is disposed, in which it is preferable that the size of the outer peripheral surface of the fourth frame 320 have the same size as the insert 100 such that the upper surface of the third elastomeric frame 310 and the upper surface of the fourth elastomeric frame 320 are flush with each other in the state in which the fourth elastomeric frame 320 is seated on the third recess portion 314 of the third elastomeric frame 310 together with the insert 100. In this case, the inner peripheral surface of the third recess portion 314 of the third elastomeric frame 310 and the outer peripheral surface of the fourth elastomeric frame 320 face each other in the rim of the insert 100.

Accordingly, thermal bonding portions are formed through thermal bonding in the interfaces between the insert 100 and the third and fourth elastomeric frames 310 and 320, respectively, whereby solid bonding and integration are achieved.

In other words, as illustrated in FIG. 4, the thermal bonding portions may include: a fifth thermal bonding portion H5 in which the third recess portion 314 of the third elastomeric frame 310 and the lower surface of the insert 100 face each other to be thermally bonded to each other; a sixth thermal bonding portion H6 in which the fourth elastomeric frame 320 and the upper surface of the insert 100 face each other to be thermally bonded to each other; a seventh thermal bonding portion H7 in which the third recess portion 314 of the third elastomeric frame 310 and the side surfaces of the insert 100 face each other to be thermally bonded to each other; and an eighth thermal bonding portion H8 in which the third recess portion 314 of the third elastomeric frame 310 and the side surfaces of the fourth elastomeric frame 320 face each other to be thermally bonded to each other.

Meanwhile, in the elastomeric frames 310 and 320 including the third elastomeric frame 310 and the fourth elastomeric frame 320, an inlet manifold through holes and outlet manifold through holes are also provided to form manifolds for introducing and discharging the reaction gas and the coolant into and from the reaction surfaces formed by the insert 100.

For example, the third inlet manifold through holes 311 through which the reaction gas and the coolant are introduced are formed in one side portion of the third elastomeric frame 310, and the third outlet manifold through holes 312 through which the reaction gas and the coolant are discharged are formed in the other side portion.

In addition, the elastomeric frames including the third elastomeric frame 310 and the fourth elastomeric frame 320 may also be provided with a means for hermetic sealing with a separator.

For example, on at least one of the lower surface and the upper surface of the third elastomeric frame 310, one or more third protrusion seals 315 surrounding the insert 100 may be formed along the outer region of the insert 100.

Meanwhile, the fourth elastomeric frame 320 is preferably made of a material less elastic than the third elastomeric frame 310 in order to ensure firm close contact between the third elastomeric frame 310 and the fourth elastomeric frame 320.

Figure 5:
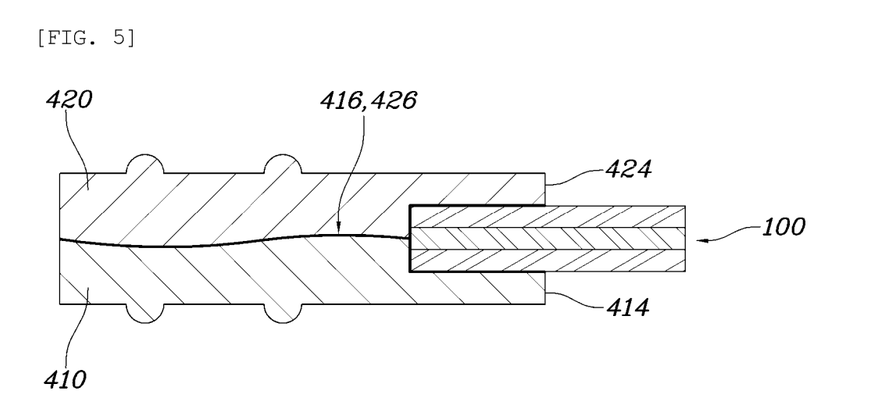
FIGS. 5 and 6 are cross-sectional views each illustrating an elastomeric cell frame for a fuel cell according to exemplary embodiments of the present disclosure.
Figure 6:
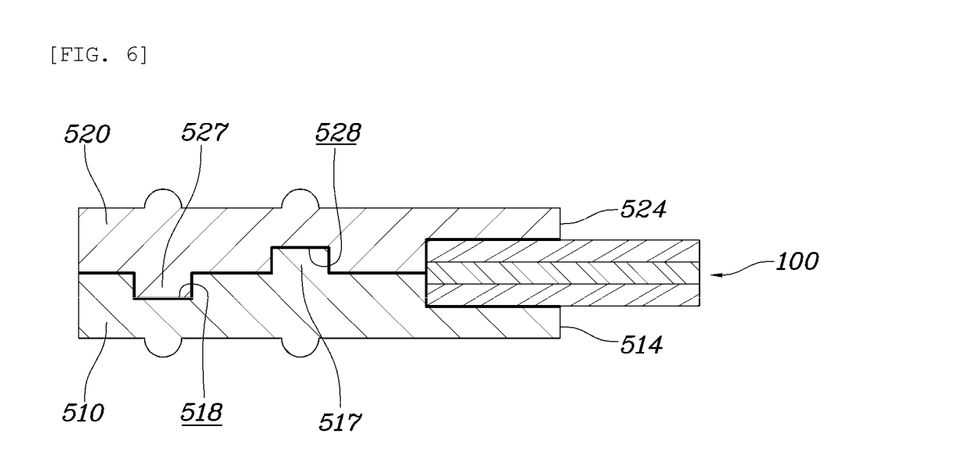

FIGS. 5 and 6 are cross-sectional views illustrating a main portion of an elastomeric cell frame for a fuel cell according to a modification of the present disclosure, in which the interfacial shape between a pair of sheet-shaped elastomeric frames forming an elastomeric frame may be changed in order to improve a bonding force therebetween.

As illustrated in FIG. 5, the regions of the pair of sheet-shaped elastomeric frames 410 and 420, which faces each other, may be formed in curved shapes so as to enlarge the interfacial area therebetween.

For example, the elastomeric frames 410 and 420 include a fifth elastomeric frame 410 disposed to surround the lower and side surfaces of the rim of the insert 100, and a sixth elastomeric frame 420 disposed to surround the upper surface and the side surface of the rim of the insert 100. In this case, the upper surface of the fifth elastomeric frame 410 and the lower surface of the sixth elastomeric frame 420 face each other in the outer region of the insert 100.

However, the upper surface of the fifth elastomeric frame 410 is formed not in a flat surface but in a curved surface 416 and the lower surface of the sixth elastomeric frame 420 is formed in a curved surface 426 corresponding to the upper surface of the fifth elastomeric frame 410 such that the upper surface of the fifth elastomeric frame 410 and the lower surface of the sixth elastomeric frame 420 face each other so as to form a curved interface therebetween.

In addition, as illustrated in FIG. 6, the regions of the pair of sheet-shaped elastomeric frames 510 and 520, which faces each other, may be formed in complementary concave-convex structures so as to enlarge the interfacial area therebetween.

For example, the elastomeric frames 510 and 520 include a seventh elastomeric frame 510 disposed to surround the lower and side surfaces of the rim of the insert 100, and an eighth elastomeric frame 520 disposed to surround the upper surface and the side surface of the rim of the insert 100. In this case, the upper surface of the seventh elastomeric frame 510 and the lower surface of the eighth elastomeric frame 520 face each other in the outer region of the insert 100.

However, the upper surface of the seventh elastomeric frame 510 is not a flat surface but may include a concave-convex structure, i.e., a structure having a protrusion 517 and a recess 518, and the lower surface of the eighth elastomeric frame 520 may have a recess 528 and a protrusion 527, which are complementary to the protrusion 517 and the recess 518 formed on the upper surface of the seventh elastomeric frame 510 such that the upper surface of the seventh elastomeric frame 510 and the lower surface of the eighth frame 520 face each other so as to form an interface in the form of the concave-convex structure therebetween.

A method of manufacturing an elastomeric cell frame for a fuel cell configured as described above will be described.

A method of manufacturing an elastomeric cell frame for a fuel cell according to an exemplary embodiment of the present disclosure includes: a step of providing an insert 100 by bonding a gas diffusion layer 120 to each of the opposite surfaces of a membrane electrode assembly 110; a step of providing a pair of sheet-shaped elastomeric frames 210 and 220; a step of disposing the pair of elastomeric frames 210 and 220 with the insert 100 therebetween; and a step of thermal bonding the pair of elastomeric frames 210 and 220 while applying heat thereto so as to thermally bond the elastomeric frames 210 and 220 to each other.

In the step of providing the insert is a step of providing the insert 100 by bonding the membrane electrode assembly 110 and the gas diffusion layers 120 to each other.

At this time, as the membrane electrode assembly 110, a general membrane electrode assembly is provided, which includes a polymer electrolyte membrane and a cathode and an anode formed on the opposite surfaces of the polymer electrolyte membrane, respectively.

In addition, as the gas diffusion layer 120, a gas diffusion layer, which is made of a substrate alone, or a general gas diffusion layer, which is made of a substrate and a Micro-Porous layer (MPL) formed on one surface of the substrate, is provided.

Then, the insert 100 is provided by laminating the gas diffusion layer 120 on each of the opposite surfaces of the membrane electrode assembly 110 to prepare an insert 100.

The step of providing a pair of elastomeric frames is a step of providing sheet-shaped elastomeric frames 210 and 220 disposed on the upper and lower surfaces of the insert 100.

At this time, the elastomeric frames 210 and 220 are provided by molding a thermoplastic elastomer, e.g., Thermoplastic Elastomer (TPE), in the form of a sheet. Preferably, the elastomeric frames are provided by molding a thermoplastic elastomer in the form of a sheet through injection molding.

In the disposing step, the insert 100 is disposed such that the rim of the insert 100 overlaps the pair of elastomeric frames 210 and 220. Preferably, the side surfaces of the rim of the insert 100 are disposed to face the inner peripheral surface of the first reaction surface through hole 213 of the first elastomeric frame 210 while the lower surface of the rim of the insert 100 is seated on the recess portion 214 of the first elastomeric frame 210. In addition, the side surfaces of the rim of the insert 100 are disposed to face the inner peripheral surface of the second reaction surface through hole 223 of the second elastomeric frame 220 while the upper surface of the rim of the insert 100 is seated on the recess portion 224 of the second elastomeric frame 220.

The bonding step is a step of bonding the pair of elastomeric frames 210 and 220 and the insert 100 to each other through thermal bonding of the elastomeric frames 210 and 220.

Here, the thermal bonding may be any one of hot-press bonding, ultrasonic bonding, high frequency bonding, vibration bonding, infrared bonding, radiant-heat bonding, calender bonding and laser bonding. In particular, the thermal bonding is preferably a hot-press bonding in which heat and pressure are easily provided.

For this purpose, the pair of elastomeric frames 210 and 220 and the insert 100 are seated in a hot press mold. At this time, the insert 100 is disposed to be interposed between the pair of elastomeric frames 210 and 220.

Then, by pressing all or a part of a region of the pair of elastomeric frames 210 and 220, which corresponds to the outer region of the insert 100, while applying heat thereto by operating the hot press mold, the pair of elastomeric frames 210 and 220 is bonded to each other and at the same time, the pair of the elastomeric frames 210 and 220 and the insert 100 are bonded to each other.

Therefore, the pair of elastomeric frames 210 and 220 and the insert 100 are bonded together while the elastomeric frames 210 and 220 are thermally bonded at the interface therebetween without a separate adhesive member.

In this case, in order to ensure firm bonding between the pair of elastomeric frames 210 and 220 and the insert 100, the heat applied to the pair of the elastomeric frames 210 and 220 has a temperature higher than the melting point of the elastomeric frames 210 and 220.

Meanwhile, the elastomeric cell frame for a fuel cell configured as described above constitutes a unit cell of a fuel cell together with a separator.

In other words, the unit cell of a fuel cell includes: an insert having a membrane electrode assembly and a pair of gas diffusion layers disposed on and bonded to opposite surfaces of the membrane electrode assembly; an elastomeric cell frame including an elastomeric frame, which is integrally formed by a pair of sheet-shaped elastomeric frames, which is respectively disposed on the lower and upper surfaces of a rim of the insert and thermally bonded to each other; and a pair of separators disposed on the opposite surface of the cell frame, respectively, so as to induce flow of a reaction gas and a coolant.

Although the present disclosure has been described with reference to the accompanying drawings and the exemplary embodiments, the present disclosure is not limited thereto, but is limited only by the following claims. Accordingly, a person ordinarily skilled in the art will appreciate that various modifications and changes can be made thereto without departing from the technical spirit and scope of the following claims.

What is claimed is:

1. An elastomeric cell frame of a unit cell of a fuel cell, the elastomeric cell frame comprising:
   an insert including a membrane electrode assembly and a pair of gas diffusion layers disposed on and bonded to opposite surfaces of the membrane electrode assembly; and
   an elastomeric frame including a pair of elastomeric frames which is bonded to each other,
   wherein the pair of elastomeric frames has portions disposed on a lower surface and an upper surface of a rim of the insert, respectively, in an outer region of the insert, and
   wherein the pair of elastomeric frames forming the elastomeric frame respectively has complementary concave-convex structures in a region in which the elastomeric frames are in contact with each other.

2. The elastomeric cell frame of claim 1, wherein the pair of elastomeric frames is integrally coupled to each other by thermal bonding, and the thermal bonding is any one of hot-press bonding, ultrasonic bonding, high frequency bonding, vibration bonding, infrared bonding, radiant-heat bonding, calender bonding or laser bonding.

3. The elastomeric cell frame of claim 1, wherein the elastomeric frame includes:
   a first elastomeric frame having a sheet shape and disposed to surround the lower surface and a side surface of the rim of the insert; and
   a second elastomeric frame having a sheet shape and disposed to surround the upper surface and the side surface of the rim of the insert and to face an upper surface of the first elastomeric frame in the outer region of the insert.

4. The elastomeric cell frame of claim 3, wherein the first elastomeric frame has a first reaction surface through hole, in which the insert is disposed, and a first recess portion arranged in an inner peripheral surface of the first reaction surface through hole, the first recess portion surrounding the lower surface and the side surface of the rim of the insert, and
   the second elastomeric frame has a second reaction surface through hole, in which the insert is disposed, and a second recess portion arranged in an inner peripheral surface of the second reaction surface through hole, the second recess portion surrounding the upper surface and the side surface of the rim of the insert.

5. The elastomeric cell frame of claim 3, wherein the first elastomeric frame includes first inlet manifold through holes arranged in one side portion thereof such that a reaction gas and a coolant are introduced therethrough, and first outlet manifold through holes arranged in another side portion thereof such that the reaction gas and the coolant are discharged therethrough, and
   the second elastomeric frame includes second inlet manifold through holes arranged in one side portion thereof to fluidly communicate with the first inlet manifold through holes, and second outlet manifold through holes arranged in another side portion thereof to fluidly communicate with the first outlet manifold through holes.

6. The elastomeric cell frame of claim 3, wherein at least one of a lower surface of the first elastomeric frame or an upper surface of the second elastomeric frame has at least one protrusion seal disposed thereon to surround the insert along the outer region of the insert.

7. The elastomeric cell frame of claim 4, wherein, between the insert and the first and second elastomeric frames, the elastomeric cell frame further comprises:
   a first thermal bonding portion in which the upper surface of the first elastomeric frame and a lower surface of the second elastomeric frame are bonded to each other in the outer region of the insert;
   a second thermal bonding portion in which the first recess portion of the first elastomeric frame and the lower surface of the rim of the insert are bonded to each other;
   a third thermal bonding portion in which the second recess portion of the second elastomeric frame and the upper surface of the rim of the insert are bonded to each other; and
   a fourth thermal bonding portion in which the first and second recess portions are bonded to the side surface of the insert.

8. The elastomeric cell frame of claim 1, wherein the elastomeric frame includes:
   a third elastomeric frame disposed to surround the lower surface and a side surface of the rim of the insert and including a third reaction surface through hole, in which the insert is disposed, and a third recess portion arranged in an inner peripheral surface of the third reaction surface through hole, the third recess portion surrounding the lower surface and the side surface of the rim of the insert; and
   a fourth elastomeric frame disposed to surround the upper surface of the rim of the insert and to face an inner peripheral surface of the third recess portion of the third elastomeric frame in the rim of the insert.

9. The elastomeric cell frame of claim 8, wherein, between the insert and the third and fourth elastomeric frames, the elastomeric cell frame further comprises:
   a fifth thermal bonding portion in which the third recess portion of the third elastomeric frame and the lower surface of the rim of the insert are bonded to each other;
   a sixth thermal bonding portion in which the fourth elastomeric frame and the upper surface of the rim of the insert are bonded to each other;
   a seventh thermal bonding portion in which the third recess portion of the third elastomeric frame and the side surface of the rim of the insert are bonded to each other; and
   an eighth thermal bonding portion in which the third recess portion of the third elastomeric frame and a side surface of the fourth elastomeric frame are bonded to each other.

10. The elastomeric cell frame of claim 8, wherein the third elastomeric frame includes third inlet manifold through holes arranged in one side portion thereof such that a reaction gas and a coolant are introduced therethrough, and third outlet manifold through holes arranged in another side portion thereof such that the reaction gas and the coolant are discharged therethrough, and outer peripheral surfaces of the fourth elastomeric frame and the insert have a same size.

11. The elastomeric cell frame of claim 8, wherein at least one of a lower surface or an upper surface of the third elastomeric frame has at least one protrusion seal disposed thereon to surround the insert along the outer region of the insert.

12. The elastomeric cell frame of claim 1, wherein the pair of elastomeric frames forming the elastomeric frame include a thermoplastic elastomer material.

13. An elastomeric cell frame of a unit cell of a fuel cell, the elastomeric cell frame comprising:

an insert including a membrane electrode assembly and a pair of gas diffusion layers disposed on and bonded to opposite surfaces of the membrane electrode assembly; and an elastomeric frame including a pair of elastomeric frames which is bonded to each other, wherein the pair of elastomeric frames has portions disposed on a lower surface and an upper surface of a rim of the insert, respectively, in an outer region of the insert, and wherein the pair of elastomeric frames forming the elastomeric frame respectively has curved surfaces in a region in which the elastomeric frames are in contact with each other.

14. A method of manufacturing an elastomeric cell frame forming a unit cell of a fuel cell stack, the method comprising:

providing an insert by bonding a gas diffusion layer to each of opposite surfaces of a membrane electrode assembly;

providing a pair of elastomeric frames;

disposing the insert between the pair of elastomeric frames; and thermal bonding the pair of elastomeric frames integrally by pressing the pair of elastomeric frames while applying heat thereto so as to thermally bond the pair of elastomeric frames to each other, wherein the pair of elastomeric frames respectively has complementary concave-convex structures in a region in which the elastomeric frames are in contact with each other.

15. The method of claim 14, wherein the providing a pair of elastomeric frames includes providing the pair of elastomeric frames by molding a thermoplastic elastomer in a sheet shape.

16. The method of claim 14, wherein the thermal bonding includes bonding the pair of elastomeric frames to each other by pressing all or a part of a region of the pair of elastomeric frames, which corresponds to an outer region of the insert, while applying heat thereto in a state in which the insert is interposed between the pair of the elastomeric frames.

17. The method of claim 14, wherein, in the thermal bonding, a temperature of heat applied to the pair of elastomeric frames is higher than a melting point of the pair of elastomeric frames.

18. The method of claim 14, wherein, in the thermal bonding, the pair of elastomeric frames are thermally bonded to each other without a separate adhesive member.

* * * * *